United States Patent
Shih et al.

(10) Patent No.: US 8,072,697 B1
(45) Date of Patent: Dec. 6, 2011

(54) IMAGING LENS SYSTEM WITH TWO LENSES

(75) Inventors: Bo-Yuan Shih, Taipei (TW); San-Woei Shyu, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 0 days.

(21) Appl. No.: 13/029,569

(22) Filed: Feb. 17, 2011

(30) Foreign Application Priority Data

Nov. 16, 2010 (TW) ................ 99139428 A

(51) Int. Cl.
- *G02B 9/04* (2006.01)
- *G02B 3/02* (2006.01)
- *G02B 15/14* (2006.01)

(52) U.S. Cl. ......... 359/795; 359/717; 359/793; 359/692

(58) Field of Classification Search .............. 359/692, 359/708, 717, 793, 795
See application file for complete search history.

(56) References Cited

U.S. PATENT DOCUMENTS

| | | | |
|---|---|---|---|
| 5,161,062 A * | 11/1992 | Shafer et al. | ............ 359/785 |
| 5,835,288 A | 11/1998 | Yamada et al. | |
| 6,876,500 B1 | 4/2005 | Sato | |
| 7,088,528 B2 | 8/2006 | Sato | |
| 7,110,190 B2 | 9/2006 | Do et al. | |
| 7,463,433 B2 * | 12/2008 | Tang | ............ 359/795 |
| 2004/0160680 A1 | 8/2004 | Shinohara | |
| 2005/0073753 A1 | 4/2005 | Sato | |
| 2008/0030875 A1 | 2/2008 | Nishizawa | |

FOREIGN PATENT DOCUMENTS

| | | |
|---|---|---|
| CN | 101046544 A | 3/2007 |
| EP | 1302801 A1 | 4/2003 |
| EP | 1793252 A1 | 6/2007 |
| EP | 1793254 A1 | 6/2007 |
| JP | 8-334684 | 12/1996 |
| JP | 2004177976 A | 6/2004 |
| JP | 2005107368 A | 4/2005 |
| JP | 2006-154517 A | 6/2006 |
| JP | 2006189586 A | 7/2006 |
| JP | 2007156031 A | 6/2007 |
| TW | I232325 | 5/2005 |
| TW | I266074 | 11/2006 |
| TW | M320680 | 10/2007 |

* cited by examiner

*Primary Examiner* — Jack Dinh

(74) *Attorney, Agent, or Firm* — Muncy, Geissler, Olds & Lowe, PLLC

(57) ABSTRACT

An imaging lens system with two lenses is provided. The imaging lens system with two lenses, along an optical axis from an object side to an image side, includes an aperture stop; a first lens having positive refractive power and being a plano-convex lens with a convex surface on the image side; and a second lens having negative refractive power and being a meniscus lens with a concave surface on the object side and a convex surface on the image side.

6 Claims, 4 Drawing Sheets

US 8,072,697 B1

IMAGING LENS SYSTEM WITH TWO LENSES

BACKGROUND OF THE INVENTION

The present invention relates to an imaging lens system with two lenses, especially to an imaging lens system for mobile phones or mini-cameras with image sensors such as CCD (Charge Coupled Device) or CMOS (Complementary Metal Oxide Semiconductor). The imaging lens system is formed by two lenses with features of wide angle, long back focal length, and low cost.

The electronics available now become more compact and multifunctional. Most of them such as digital cameras, PC (personal computer) cameras, network cameras and mobile phones, even personal digital assistants (PDA) are equipped with an image lens system. The imaging lens system not only requires good imaging quality but also needs compact volume and lower cost. Moreover, the imaging lens system with larger field angle can improve image quality of the electronics and match users' requirements.

There are various designs such as two lenses, three lenses, four lenses or five lenses of the imaging lens system applied to mini electronics. Yet while a compromise of resolution and cost, the two lenses is preferred.

There are various structures of conventional two lenses imaging lens system and the difference among them or technical character is in the shape of the two lenses, location of the convex surface/concave surface, positive/negative refractive power, or relative optical parameters. Among these designs, the combination of a first lens with positive refractive power and a second lens with positive refractive power can achieve requirement of minimized volume, such as prior arts revealed in US2005/0073753, US2004/0160680, U.S. Pat. No. 7,110,190, U.S. Pat. No. 7,088,528, US2004/0160680, EP1793252, EP1302801, JP2007-156031, JP2006-154517, JP2006-189586, TWM320680, TWI232325, and CN101046544 etc.

However, the volume of these imaging lens systems still requires further improvement. For larger field angle, the imaging lens system in US2008/0030875 includes a lens with positive refractive power and a lens with negative refractive power, the imaging lens system in U.S. Pat. No. 5,835,288 is formed by combinations of biconcave lenses and biconvex lenses, the systems in JP08-334684, JP2005-107368 use combinations of positive/positive refractive power or negative/positive refractive power. Or as shown in JP2004-177976, EP1793252, EP1793254, U.S. Pat. No. 6,876,500, US2004/0160680, U.S. Pat. No. 7,088,528, TWI266074, the combination of the lens with positive refractive power and the lens with positive refractive power.

A common feature of the imaging lens systems described above is that the back focal length is short. The disadvantage of short back focal length is when the electronics become more compact, the imaging lens systems will become more compact with the electronics; therefore, the back focal length is getting shorter with the proportion of the imaging lens systems. Besides the lenses, the imaging lens system also includes a IR (infrared) cut-off filter and a glass. Because thickness of the IR cut-off filter and the glass is fixed, when the imaging lens system becomes more compact, the back focal length that gets shorter with the proportion of the imaging lens system is short enough to dispose the IR cut-off filter and the glass.

Therefore, the users require the imaging lens system with larger field angle and long back focal length. The present invention provides a better design of the imaging lens system applied to electronics such as mini cameras and camera phones.

SUMMARY OF THE INVENTION

In view of the problems in the art above, the object of the present invention is to provide an imaging lens system with two lenses, along an optical axis from an object side to an image side, comprising: an aperture stop; a first lens having positive refractive power and being a plano-convex lens with a convex surface on the image side; and a second lens having negative refractive power and being a meniscus lens with a concave surface on the object side and a convex surface on the image side.

The imaging lens system with two lenses can further satisfy the equation:

$$0.49 \leq BFL/TL \leq 0.53 \qquad (1)$$

wherein BFL is back focal length of the imaging lens system, and TL is distance from the aperture stop to an image plane.

The imaging lens system with two lenses can further satisfy the equation:

$$65° \leq 2\omega \leq 80° \qquad (2)$$

wherein $2\omega$ is maximum field angle.

The image side of the first lens is aspherical surface.

Both the convex surface and the concave surface of the second lens are aspherical surfaces.

Both the first lens and the second lens are made from plastic.

DETAILED DESCRIPTION OF THE PREFERRED EMBODIMENT

Figure 1:
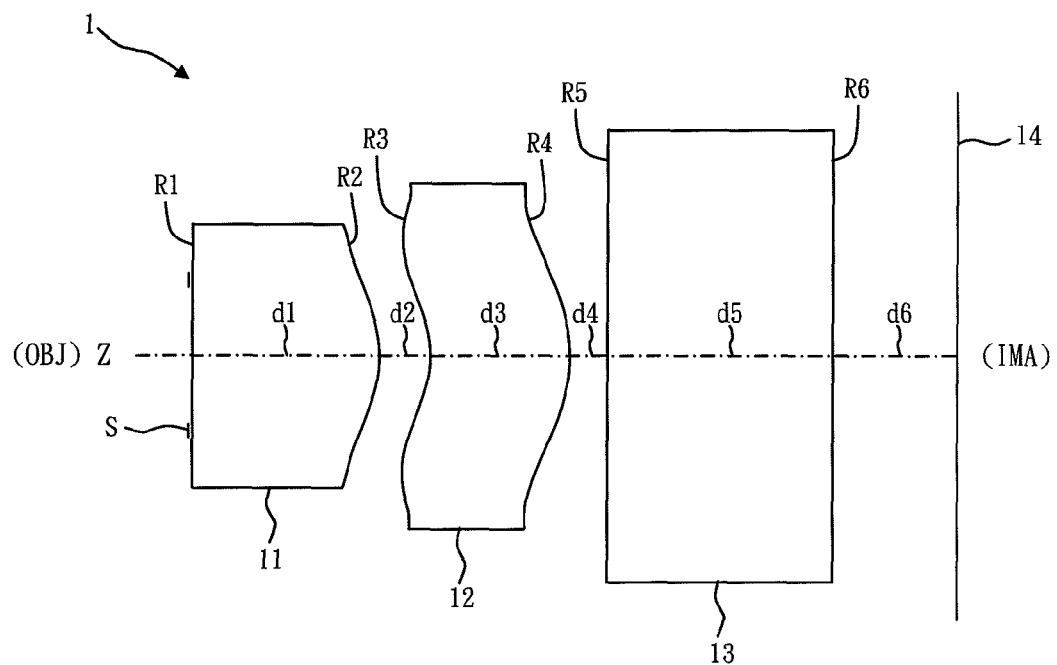
FIG. 1 is a schematic drawing showing a structure of an image lens system with two lenses according of the present invention.

Refer to FIG. 1, along an optical axis Z from the object side to the image side, an imaging lens system 1 according to the present invention includes an aperture stop S, a first lens 11, a second lens 12, an IR (infrared) cut-off filter 13, and an image sensor 14.

The first lens 11 is a plano-concave lens with a convex surface on the image side and has positive refractive power.

The first lens 11 is made from plastic whose refractive index ($N_d$) is larger than 1.5. Moreover, the image side R2 of the first lens 11 is an aspherical surface.

The second lens 12 is a meniscus lens with negative refractive power, and the surface on the object side R3 is a concave surface while the surface on the image side R4 is a convex surface. The second lens 12 is made from plastic whose refractive index ($N_d$) is larger than 1.6. Both the convex surface and the concave surface of the second lens 12 are aspherical surfaces.

The aperture stop S is a front-positioned aperture that can be attached on an object side surface R1 of the first lens 11. The IR cut-off filter 13 is a lens or a film filtering IR light and formed by coating. The image sensor 14 is a CCD or a CMOS.

While capturing images, light from the object passes the first lens 11, the second lens 12, and the IR cut-off filter 13 to form an image on the image sensor 14. Through optical combinations of the radius of curvature of the optical surface and the aspherical surface of the first lens 11 as well as the second lens 12, the lens thickness (d1, d3) and the air gap (d2, d4), the field angle is larger than 68°.

The aspherical Surface Formula is the following equation (3):

$$Z = \frac{ch^2}{1+\sqrt{1-(1+K)c^2h^2}} + A_4h^4 + A_6h^6 + A_8h^8 + A_{10}h^{10} + A_{12}h^{12} \quad (3)$$

wherein c is a radius of curvature,
h represents height of the lens,
K is a conic constant,
$A_4$~$A_{12}$ respectively are 4th, 6th, 8th, 10th, and 12th order aspherical coefficient.

According to the above structure, the imaging lens system 1 of the present invention has larger maximum field angle and long back focal length, and the lens system satisfies the equation (1) or equation (2). Furthermore, the aberration is further corrected and the chief ray angle is reduced.

Refer to tables of each embodiment below: the table includes data of optical surface number in order from the object side to the image side, the radius of curvature R (mm) of each optical surface on the optical axis, the on-axis surface spacing d (mm) of each optical surface, the refractive index $N_d$ of the lens and the Abbe's number $v_d$ of the lens. The optical surface of the lens labeled with * represents an aspherical surface. Fno, f, 2ω represent aperture value (f number), effective focal length and maximum field angle of the imaging lens system 1, respectively.

The First Embodiment

Figure 2:
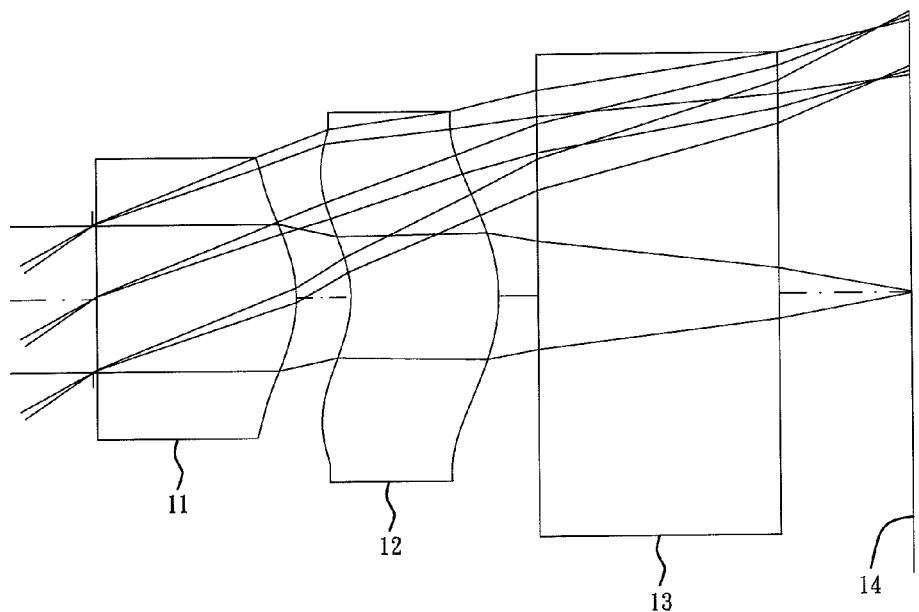
FIG. 2 is a schematic drawing showing light path of the image lens system with two lenses according to the first embodiment of the present invention.
Figure 3A:
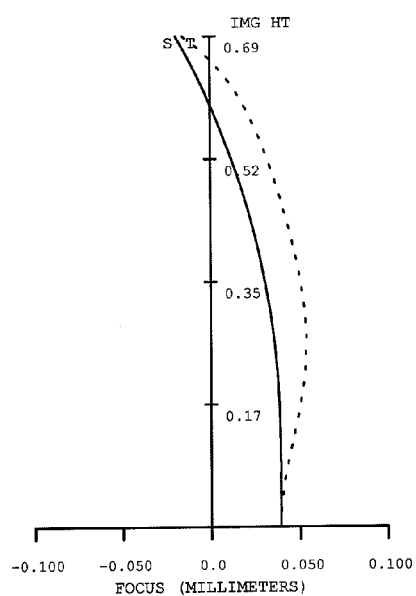
FIGS. 3A and 3B are drawings showing field curvature and distortion of an image according to the first embodiment of the present invention.
Figure 3B:
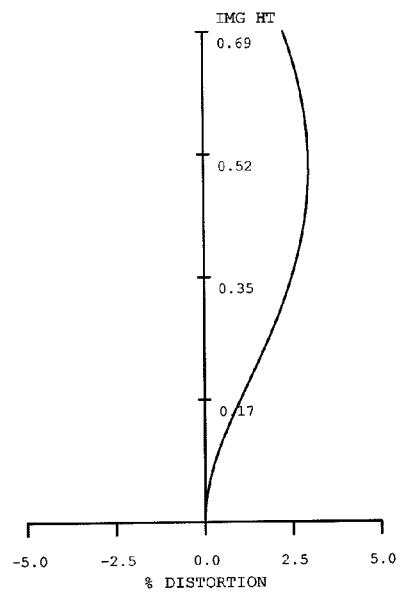

Refer to FIG. 2 & FIGS. 3A and 3B, which show the structure and optical path, and field curvature and distortion of an image of the imaging lens system 1, respectively.

TABLE 1

| Fno = 2.8 | | f = 1.0352 | | 2ω = 68.0 |
|---|---|---|---|---|
| optical surface | | radius of curvature R (mm) | spacing d (mm) | refractive index $N_d$ | Abbe's number $v_d$ |
| 1 | OBJ | | 500 | | |
| | STOP | | 0.0100 | | |
| 2 | R1 | ∞ | 0.5069 | 1.50 | 55.00 |
| 3 | R2* | −0.3476 | 0.1394 | | |
| 4 | R3* | −0.2908 | 0.3772 | 1.60 | 29.30 |
| 5 | R4* | −0.4373 | 0.1000 | | |
| 6 | IR/CG | ∞ | 0.6100 | | |
| 7 | | | 0.3370 | | |
| 8 | IMA | | | | |

* represents an aspherical surface

TABLE 2

| optical surface | k | A4 | A6 | A8 | A10 | A12 |
|---|---|---|---|---|---|---|
| R2* | −9.8673E−01 | 3.3248E+00 | 4.8372E+01 | −2.1605E+02 | −1.1020E+02 | −2.3644E+03 |
| R3* | −9.1557E−01 | 8.9611E+00 | 6.9734E+01 | −9.6674E+02 | 4.6152E+03 | −8.4070E+03 |
| R4* | −2.8379E−01 | 2.5801E+00 | 7.5880E+00 | 2.8139E+01 | −1.4062E+02 | 3.0424E+02 |

In this embodiment, the first lens 11 is made from plastic with the refractive index $N_{d1}$ of 1.50 and Abbe's number $v_{d1}$ of 55.00 while the second lens 12 is made from plastic with the refractive index $N_{d2}$ of 1.60 and Abbe's number $v_{d2}$ of 29.30. The IR cut-off filter 13 is made from BK7 (a glass material name).

The f is 1.0352 mm, $f_1$ is 0.6869 mm, $f_2$ is −50.0205 mm, TL is 2.0804 mm, and BFL is 1.0414 mm, satisfying from the equation (1) to the equation (2).

BFL/TL=0.5006; 2ω=68°

According to the tables 1 and 2, and FIGS. 2, 3A and 3B, this embodiment can correct the aberration and can achieve the high resolution, wide angle and long back focal length.

The Second Embodiment

Figure 4:
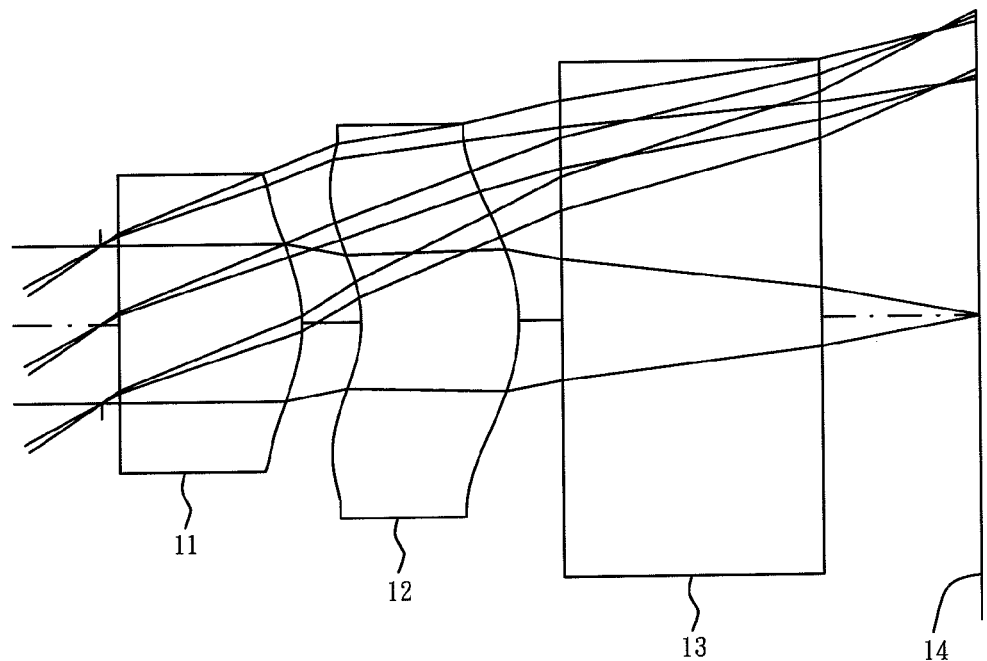
FIG. 4 is a schematic drawing showing light path of the image lens system with two lenses according to second embodiment of the present invention.
Figure 5A:
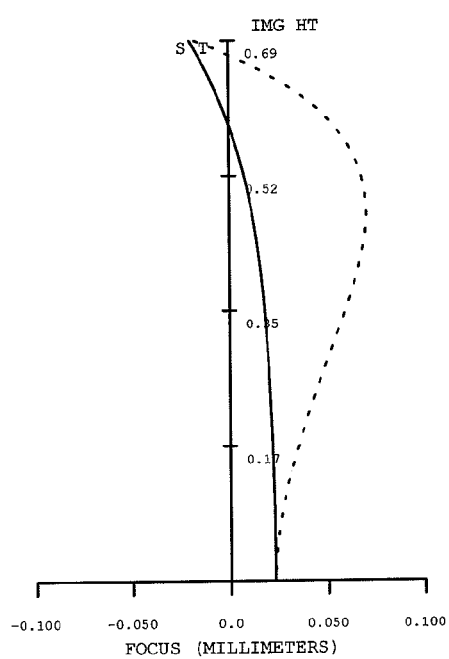
FIGS. 5A and 5B are drawings showing field curvature and distortion of an image according to the second embodiment of the present invention.
Figure 5B:
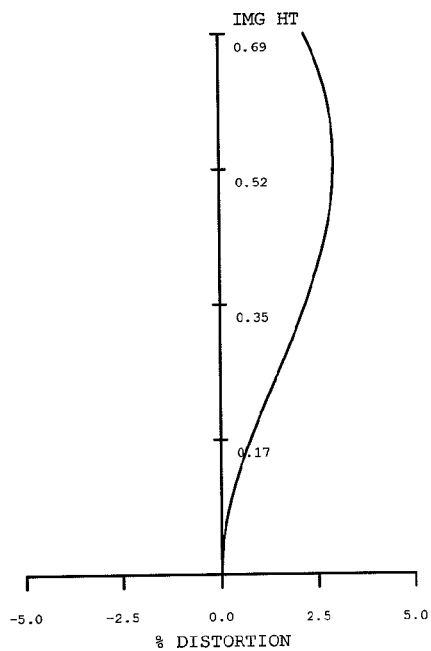

Refer to FIG. 4 & FIGS. 5A and 5B, which show the structure and optical path, and field curvature and distortion of an image of the imaging lens system 1, respectively.

TABLE 3

| Fno = 2.8 | | f = 1.0317 | | 2ω = 67.8 |
|---|---|---|---|---|
| optical surface | | radius of curvature R (mm) | spacing d (mm) | refractive index $N_d$ | Abbe's number $v_d$ |
| 1 | OBJ | | 500 | | |
| | STOP | | 0.0424 | | |
| 2 | R1 | ∞ | 0.4295 | 1.50 | 55.00 |
| 3 | R2* | −0.3661 | 0.1387 | | |
| 4 | R3* | −0.3016 | 0.3707 | 1.60 | 29.30 |
| 5 | R4* | −0.4324 | 0.1000 | | |
| 6 | IR/CG | ∞ | 0.6100 | | |
| 7 | | | 0.3693 | | |
| 8 | IMA | | | | |

* represents an aspherical surface

TABLE 4

| optical surface | k | A4 | A6 | A8 | A10 | A12 |
|---|---|---|---|---|---|---|
| R2* | −1.1783E+00 | 3.7189E+00 | 4.0466E+01 | −2.1515E+02 | 1.4558E+01 | −3.0650E+03 |
| R3* | −9.0479E−01 | 8.9079E+00 | 6.8512E+01 | −9.6601E+02 | 4.6376E+03 | −8.5142E+03 |
| R4* | −3.3689E−01 | 2.2932E+00 | 9.0733E+00 | 2.7689E+01 | −1.6335E+02 | 2.7423E+02 |

In this embodiment, the first lens 11 is made from plastic with the refractive index $N_{d1}$ of 1.50 and Abbe's number $v_{d1}$ of 55.00 while the second lens 12 is made from plastic with the refractive index $N_{d2}$ of 1.60 and Abbe's number $v_{d2}$ of 29.30. The IR cut-off filter 13 is made from BK7 (a glass material name).

The f is 1.0317 mm, $f_1$ is 0.7234 mm, $f_2$ is 23.6486 mm, TL is 2.0606 mm, and BFL is 2.0606 mm, satisfying from the equation (1) to the equation (2).

BFL/TL=0.5210; 2ω=67.76°

According to the tables 3 and 4 and FIGS. 4, 5A and 5B, this embodiment can correct the aberration and can achieve the high resolution, wide angle and long back focal length.

The Third Embodiment

Figure 6:
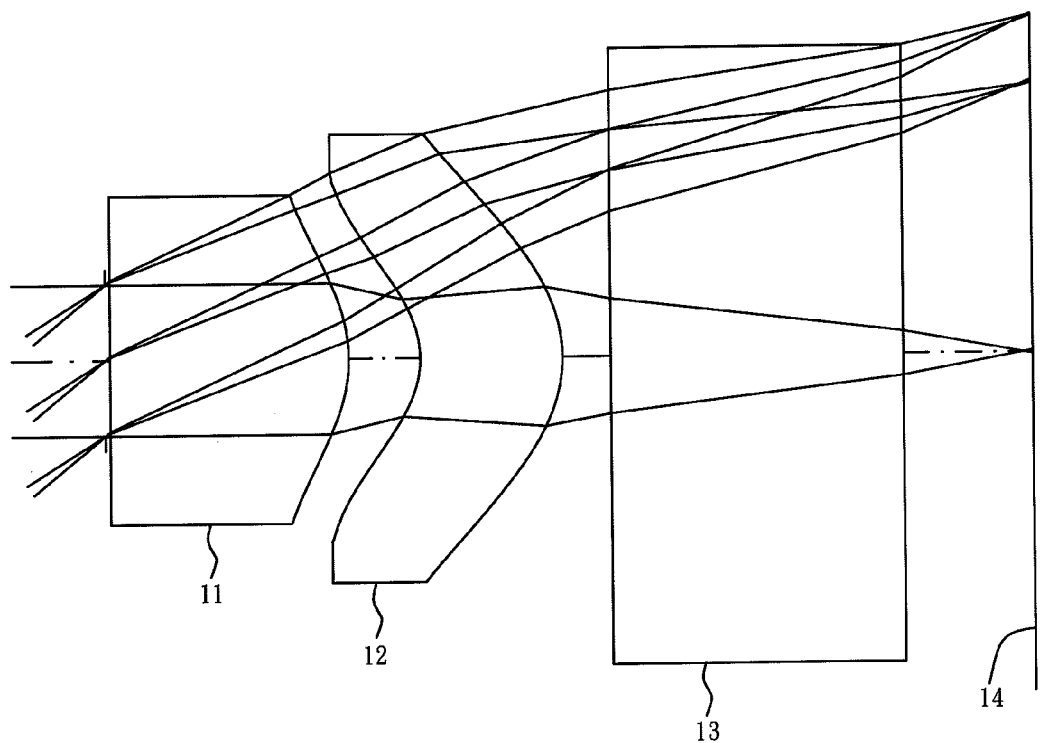
FIG. 6 is a schematic drawing showing light path of the image lens system with two lenses according to third embodiment of the present invention.
Figure 7A:
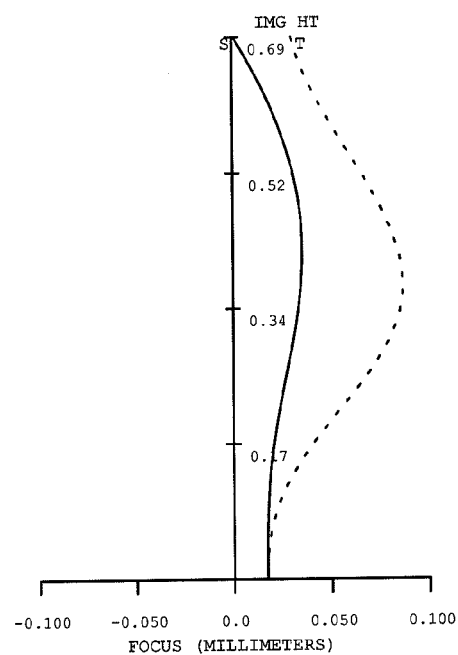
FIGS. 7A and 7B are drawings showing field curvature and distortion of an image according to the third embodiment of the present invention.
Figure 7B:
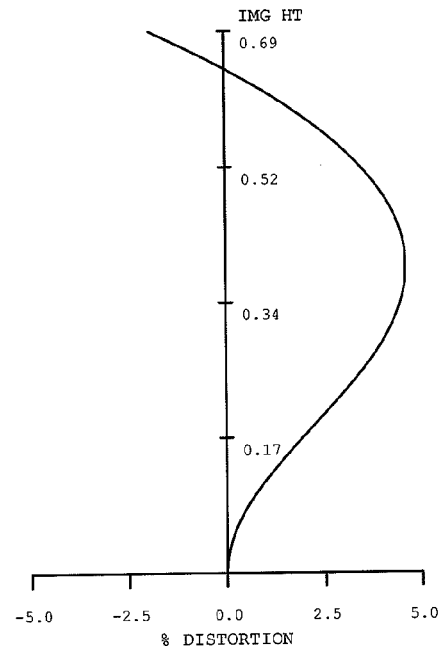

Refer to FIG. 6 & FIGS. 7A and 7B, which show the structure and optical path, and field curvature and distortion of an image of the imaging lens system 1, respectively.

TABLE 5

| Fno = 2.8 | | f = 0.8792 | | 2ω = 78.6 | |
|---|---|---|---|---|---|
| optical surface | | radius of curvature R (mm) | spacing d (mm) | refractive index $N_d$ | Abbe's number $v_d$ |
| 1 | OBJ | | 500 | | |
| | STOP | | 0.0100 | | |
| 2 | R1 | ∞ | 0.5005 | 1.50 | 55.00 |
| 3 | R2* | −0.3134 | 0.1496 | | |
| 4 | R3* | −0.1945 | 0.2968 | 1.60 | 29.30 |
| 5 | R4* | −0.2882 | 0.1000 | | |
| 6 | IR/CG | ∞ | 0.6100 | | |
| 7 | | | 0.2718 | | |
| 8 | IMA | | | | |

* represents an aspherical surface

TABLE 6

| optical surface | k | A4 | A6 | A8 | A10 | A12 |
|---|---|---|---|---|---|---|
| R2* | −1.4315E+00 | 2.6846E+00 | 1.1792E+01 | −1.0587E+02 | 1.2313E+03 | −6.0452E+03 |
| R3* | −9.4276E−01 | 9.2978E+00 | 6.6453E+01 | −9.2334E+02 | 4.8965E+03 | −1.0062E+04 |
| R4* | −7.1007E−01 | 2.0759E+00 | 1.3926E+01 | 7.6745E+00 | −2.7707E+02 | 8.9562E+02 |

In this embodiment, the first lens 11 is made from plastic with the refractive index $N_{d1}$ of 1.50 and Abbe's number $v_{d1}$ of 55.00 while the second lens 12 is made from plastic with the refractive index $N_{d2}$ of 1.60 and Abbe's number $v_{d2}$ of 29.30. The IR cut-off filter 13 is made from BK7 (a glass material name).

The f is 0.8792 mm, $f_1$ is 0.6193 mm, $f_2$ is 5.0496 mm, TL is 1.9386 mm, and BFL is 0.9818 mm, satisfying from the equation (1) to the equation (2).

BFL/TL=0.5064; 2ω=78.6°

According to the tables 5 and 6 and FIGS. 6, 7A and 7B, this embodiment can correct the aberration and can achieve the high resolution, wide angle and long back focal length.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An imaging lens system with two lenses, along an optical axis from an object side to an image side, comprising:
   an aperture stop;
   a first lens having positive refractive power and being a plano-convex lens with a convex surface on the image side; and
   a second lens having negative refractive power and being a meniscus lens with a concave surface on the object side and a convex surface on the image side.

2. The system as claimed in claim 1, wherein the imaging lens system with two lenses satisfies the equation:

$$0.49 \leq BFL/TL \leq 0.53$$

wherein BFL is back focal length of the imaging lens system, and TL is distance from the aperture stop to an image plane.

3. The system as claimed in claim 1, wherein the imaging lens system with two lenses satisfies the equation:

$$65° \leq 2\omega \leq 80°$$

wherein 2ω is maximum field angle.

4. The system as claimed in claim 1, wherein the image side of the first lens is aspherical surface.

5. The system as claimed in claim 1, wherein both the convex surface and the concave surface of the second lens are aspherical surfaces.

6. The system as claimed in claim 1, wherein both the first lens and the second lens are made from plastic.

* * * * *